United States Patent
Hofmann

(10) Patent No.: US 11,125,297 B2
(45) Date of Patent: Sep. 21, 2021

(54) ADJUSTMENT DEVICE FOR A FLAP ASSEMBLY AND MOTOR VEHICLE WITH AN ADJUSTMENT DEVICE OF THIS TYPE

(71) Applicant: SUSPA GmbH, Altdorf (DE)

(72) Inventor: Manfred Hofmann, Hettstadt (DE)

(73) Assignee: SUSPA GmbH, Altdorf (DE)

( * ) Notice: Subject to any disclaimer, the term of this patent is extended or adjusted under 35 U.S.C. 154(b) by 124 days.

(21) Appl. No.: 16/546,829

(22) Filed: Aug. 21, 2019

(65) Prior Publication Data

US 2020/0063816 A1 Feb. 27, 2020

(30) Foreign Application Priority Data

Aug. 22, 2018 (DE) .................. 10 2018 214 150.9

(51) Int. Cl.
*F16F 9/02* (2006.01)
*E05F 1/10* (2006.01)

(52) U.S. Cl.
CPC .......... *F16F 9/0263* (2013.01); *E05F 1/1091* (2013.01); *F16F 9/0281* (2013.01); *E05Y 2900/536* (2013.01)

(58) Field of Classification Search
CPC ...... F16F 9/0263; F16F 9/0281; F16F 9/0209; F16F 9/062; E05F 1/1091; E05Y 2900/536
USPC ................ 267/64.13, 196; 188/297
See application file for complete search history.

(56) References Cited

U.S. PATENT DOCUMENTS

| | | | | |
|---|---|---|---|---|
| 4,166,612 A * | 9/1979 | Freitag | ...................... | F16F 9/49 188/284 |
| 4,230,309 A * | 10/1980 | Schnitzius | ............ | F16F 9/0209 16/66 |
| 4,240,619 A * | 12/1980 | Wirges | .................. | E05F 1/1091 267/120 |
| 4,650,165 A * | 3/1987 | Siemann | ............... | F16F 9/0218 188/300 |
| 4,934,493 A * | 6/1990 | Bauer | ...................... | D06F 37/20 188/381 |
| 5,702,091 A * | 12/1997 | Perrin | ................... | F16F 9/0245 188/280 |
| 5,845,749 A * | 12/1998 | Moretz | ................... | F16F 9/362 188/281 |
| 6,007,057 A * | 12/1999 | Fuhrmann | ................. | E05F 3/02 188/282.1 |
| 6,520,493 B2 * | 2/2003 | Larsen | .................... | F16F 7/085 267/201 |
| 7,428,953 B2 * | 9/2008 | Kneip | ................... | F16F 9/0227 188/313 |
| 8,348,028 B2 * | 1/2013 | Zimmer | .................... | F16F 7/09 188/288 |
| 2008/0066385 A1 * | 3/2008 | Roach | ................... | E05F 1/1091 49/386 |

FOREIGN PATENT DOCUMENTS

DE 4103521 A1 8/1992
DE 19740143 A1 4/1999

* cited by examiner

*Primary Examiner* — Thomas W Irvin
(74) *Attorney, Agent, or Firm* — McGlew and Tuttle, P.C.

(57) ABSTRACT

An adjustment device for a flap assembly includes a housing having a longitudinal axis, two mounting spots spaced from one another along the longitudinal axis, an energy storage unit acting along the longitudinal axis and a friction damping unit acting serially in relation to the energy storage unit.

20 Claims, 4 Drawing Sheets

ADJUSTMENT DEVICE FOR A FLAP ASSEMBLY AND MOTOR VEHICLE WITH AN ADJUSTMENT DEVICE OF THIS TYPE

CROSS-REFERENCE TO RELATED APPLICATIONS

This application claims the priority of German Patent Application, Serial No. DE 10 2018 214 150.9, filed on Aug. 22, 2018, pursuant to 35 U.S.C. 119(a)-(d), the content of which is incorporated herein by reference in its entirety as if fully set forth herein.

FIELD OF THE INVENTION

The invention relates to an adjustment device for a flap assembly and to a motor vehicle with an adjustment device of this type.

BACKGROUND OF THE INVENTION

A flap assembly configured as a front hood of a motor vehicle is known. An adjustment device, which comprises an energy storage unit such as a spring member, assists the opening of the flap assembly and avoids the inadvertent closing thereof, in particular a falling down of the flap due to gravity. The energy storage unit has a maximum travel distance, in other words a maximum extension length, where the flap assembly is opened maximally. In particular when configured as a motor vehicle front hood, it may be necessary to open the flap assembly beyond the maximum opening position for maintenance and/or repair.

SUMMARY OF THE INVENTION

The invention is based on the object of improving the opening behavior of a flap assembly.

This object is achieved by an adjustment device for a flap assembly, the adjustment device having a housing having a longitudinal axis, two mounting spots spaced from one another along the longitudinal axis, an energy storage unit acting along the longitudinal axis, and a friction damping unit acting serially in relation to the energy storage unit. According to another aspect, this object is achieved by a motor vehicle with a flap assembly and with an adjustment device according to the invention. The gist of the invention is that an adjustment device has an energy storage unit and, in addition thereto, a friction damping unit. The friction damping unit acts serially in relation to the energy storage unit. The energy storage unit and the friction damping unit are connected in series. In particular, only the energy storage unit is active at first until a maximum extension length is reached. When the maximum extension length of the energy storage unit is reached, the friction damping unit is then activated additionally. In other words, the energy storage unit is even active in particular while the friction damping unit is being activated. The energy storage unit assist an entire opening process from a closed position to a service position with a first opening angle up to a mounting position with a second opening angle. The friction damping unit connected in series allows an additional adjusting movement, in other words an additional extension movement of the adjustment device, when the maximum extension length of the energy storage has already been reached. Owing to the friction damping unit, the adjustment device has a total extension length that is greater than the maximum extension length of the energy storage unit. The friction damping unit provides a frictional effect that is sufficient to prevent an inadvertent retracting of the adjustment device, in particular due to gravity. On the other hand, however, the frictional effect is sufficiently small to allow manual operation of the flap assembly. The frictional force provided by the friction damping unit is in particular between 50 N and 300 N, in particular between 100 N and 200 N. The frictional force can in particular be set by modifying the design, in particular the bias of the friction partners, in particular of a friction member abutting the energy storage unit, by changing the size of the friction surfaces and/or selecting different materials for the friction partners. The frictional force to be set is for example dependent on the desired force for operating the flap assembly manually and/or on the retaining force a flap of the flap assembly, in particular the front hood of a motor vehicle, is supposed to provide. The adjustable frictional force may also be dependent on the articulation of the adjustment device to the flap assembly, in particular to the car body, and/or on the pivotable flap of the flap assembly and a resulting leverage.

The adjustment device according to the invention in particular advantageously allows adjustment of a flap assembly, configured in particular as a front hood of a motor vehicle. The flap assembly comprises in particular a flap hinged to a casing, in particular a car body. The adjustment device according to the invention may however also be used for a flap assembly configured such that the flap is arranged on a casing in such a way as to be extendable linearly.

An adjustment device configured such that the friction damping unit is fixed to the housing is particularly simple to produce. The design of the adjustment device is rugged. The friction damping unit is integrated in the housing of the adjustment device in a compact manner.

An adjustment device configured such that the energy storage unit is arranged at least partly in the housing such as to be displaceable along the longitudinal axis, in particular displaceable relatively in relation to the friction damping unit, allows a particularly simple implementation of the serial connection of energy storage unit and friction damping unit. It was found that the energy storage unit as a whole can be configured such as to be displaceable linearly relative to the housing of the adjustment device. As the energy storage unit is displaceable relative to the friction damping unit, a frictional effect, in other words a frictional force, may be provided directly between the energy storage unit and the housing.

An adjustment device configured such that the friction damping unit has a friction member is particularly simple. The friction damping unit in particular consists only of at least one friction member. The friction member is in particular made of a friction material, in particular of an elastic foam material. The friction member can be configured as a friction strip, which is bent to form a ring that is inserted in the housing about the longitudinal axis of the housing. The production of the friction strip and the friction member is thus simplified. It is also conceivable to provide a plurality of friction members arranged one behind the other along the longitudinal axis. It is also conceivable to provide a plurality of friction members arranged around the longitudinal axis along the circumference thereof. It is also conceivable to produce the friction member in the form of a friction ring made of a friction material.

An adjustment device configured such that the friction member is arranged between the housing and the energy storage unit in a radial direction relative to the longitudinal axis to provide a friction damping effect between the housing and the energy storage unit ensures a sufficient damping effect.

In particular, the at least one friction member is arranged with a bias between the housing and the energy storage unit in a radial direction relative to the longitudinal axis. The at least one friction member is pressed between the housing and the energy storage unit in the radial direction relative to the longitudinal axis.

An adjustment device configured such that the friction member is held axially in the housing ensures the reliable arrangement of the friction member and, therefore, the reliable provision of the friction effect with good repeatability. The friction member is held in the housing, for example in an annular radial recess thereof. The recess is in particular formed integrally, in other words in one piece, with the housing and has front-end stop surfaces for the friction member. It is also conceivable that a detachable cap is placed on the housing instead of one of the stop surfaces, the cap serving as a stop for the friction member.

The axial extension of the recess in the housing essentially corresponds to the axial length of the friction member. It is also conceivable for the recess to have an axial extension that is smaller than the axial length of the friction member so the friction member is arranged in the recess with an axial bias along the longitudinal axis of the housing.

An adjustment device configured such that the energy storage unit is configured as a gas spring allows a particularly advantageous storage of energy. A gas spring is available as a standard component in various sizes. A gas spring is rugged and maintenance-free. Alternatively, it is conceivable to provide an energy storage unit configured as a helical spring.

An adjustment device configured such that the housing is formed in one piece, in particular of a plastic material, allows the shape of the housing to be designed flexibly. In particular the recess for the friction member can be formed on the housing in an uncomplicated manner. The adjustment device has a lightweight design and is particularly well suited for use in the automotive sector.

An adjustment device configured such that the energy storage unit and the friction damping unit are coupled to one another serially and steplessly ensures a user-friendly serial connection of energy storage unit and damping unit. The friction damping unit can be activated steplessly by manually exerting a force that exceeds the frictional force provided by the friction damping unit. In particular, the friction damping unit is activated only by manually exerting an excess pressure to overcome the frictional force. In particular, it is not necessary to unlock a latching mechanism to activate the friction damping unit. The energy storage unit and the friction damping unit are coupled with one another in a latch-free manner. The handling of the adjustment device is simplified. An additional unlocking, for example by pressing latches or opening locking bars, is omitted.

A motor vehicle with a flap assembly and a damping device has essentially the same advantages as the adjustment device to which reference is made herewith. For example, the front hood, which is part of the flap assembly, can be displaced, by means of the energy storage unit, relative to the car body into a standard open position. The standard open position is also referred to as service position. The standard open position is reached when the energy storage unit is in a maximum extension position. In this standard opening position, the front hood is arranged at a first opening angle in relation to the car body of the motor vehicle. An excess pressure can be exerted by manual operation, for example, to overcome the frictional force provided by the friction damping unit so as to bring about an additional extension of the adjustment device in such a way that the energy storage unit as a whole is moved out of the housing. The front hood can be displaced in relation to the car body of the motor vehicle into a maximum opening position. The maximum opening position is also referred to as mounting position. In the maximum opening position, the front hood is arranged at a second opening angle in relation to the car body. The second opening angle is greater than the first opening angle.

Both the features set out in the patent claims and the features set out in the following exemplary embodiments of an inventive apparatus are suitable, both on their own and taken in combination with each other, to refine the inventive subject matter. The respective combinations of features are not to be construed as limiting the subject matter of the invention to the refinements disclosed therein but are included only to serve as examples.

Further features, advantages and details of the invention will emerge from the ensuing description of an exemplary embodiment, taken in conjunction with the drawing.

Details of the exemplary embodiment explained in more detail in the following sections may also constitute an invention or part of an inventive subject matter on their own.

DESCRIPTION OF THE PREFERRED EMBODIMENT

Figure 1:
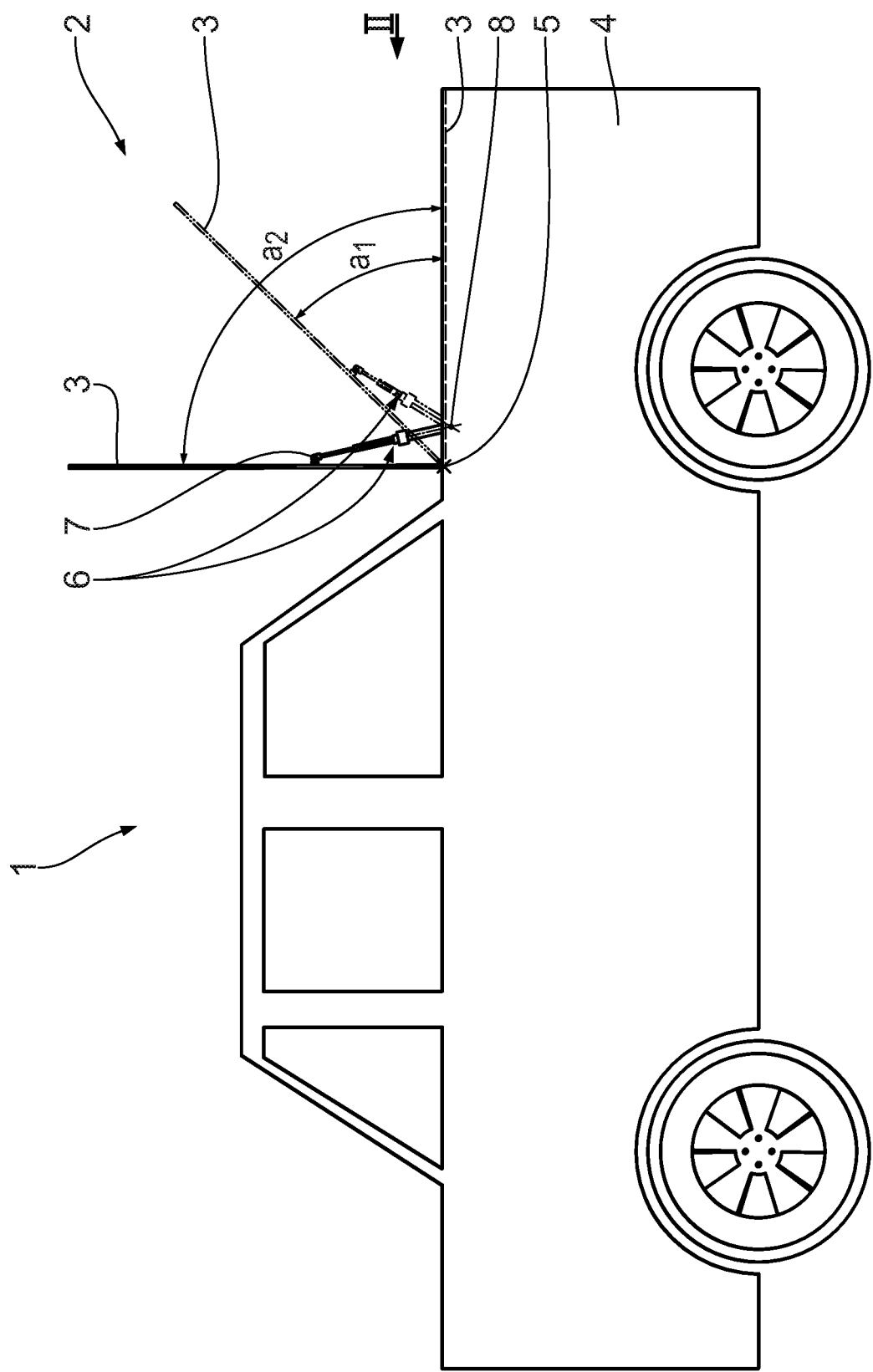
FIG. 1 shows a schematic view of a motor vehicle with a flap assembly and with an adjustment device according to a first exemplary embodiment.
Figure 2:
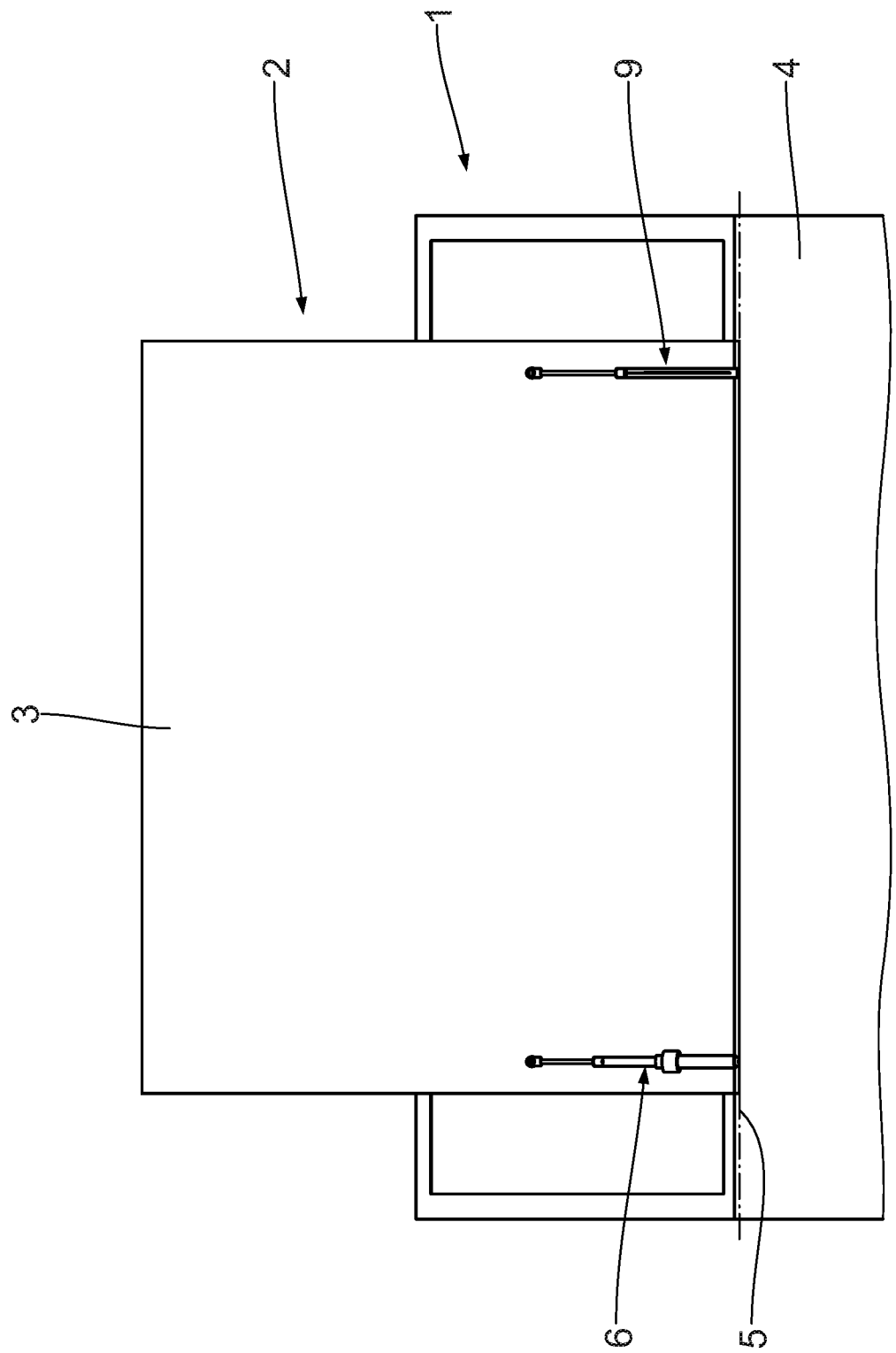
FIG. 2 shows a view according to arrow II in FIG. 1.

A motor vehicle 1 configured as an automobile shown in FIG. 1 and FIG. 2 has a flap assembly 2. The flap assembly 2 comprises a flap 3, which is hinged to a car body 4, forming a casing, in such a way as to be pivotable about a pivot axis 5. The flap assembly 2 further comprises an adjustment device 6, which supports the pivoting movement of the flap 3 in relation to the car body 4. The adjustment device 6 in particular supports an opening movement of the flap 3 to overcome gravity. The adjustment device 6 in particular prevents an inadvertent closing of the flap 3 due to gravity.

A first end 7 of the adjustment device 6 is hinged to the flap 3. A second end 8, which is arranged opposite the first end 7, of the adjustment device 6 is hinged to the car body 4. It is conceivable to provide several, in particular two, adjustment devices 6 for the flap assembly 2, the adjustment devices 6 being spaced from one another in a direction parallel to the pivot axis 5.

In the exemplary embodiment shown, precisely one adjustment device 6 is provided, which, as shown in FIG. 2, is arranged in a left-hand edge region of the flap 3. In an opposing lateral edge region shown on the right of FIG. 2, a standard energy storage member 9 is provided, which is hinged to the flap 3 or to the car body 4 with a respective end thereof. The standard energy storage member 9 is in particular a gas spring.

In FIG. 1, the flap assembly 2 is shown in three different positions.

In a closed position, the flap assembly 2 is closed. In the closed position, an opening angle between the flap 3 and the car body 4 is 0°. The flap 3 abuts the car body 4. According to the exemplary embodiment shown, the flap 3 is disposed in a horizontal arrangement. Depending on the design of the car body 4, the flap 3 may naturally also be arranged in a position that is tilted in relation to the horizontal when in the closed position. In the closed position, the adjustment device 6 is in a retracted arrangement. In the retracted arrangement, the adjustment device 6 is retracted maximally. In the retracted arrangement, the adjustment device 6 has a minimum extension length.

In a service position of the flap assembly 2, the flap 3 is arranged at a first open angle $a_1$ in relation to the car body 4 and the pivot axis 5. In the exemplary embodiment shown, the opening angle $a_1$ is 45°.

It is advantageous if the first opening angle $a_1$ is between 30° and 75°, in particular between 40° and 60°. Depending on the actual installation of the flap assembly 2 or the adjustment device 6, the first opening angle $a_1$ may also be selected such as to smaller than 30° or greater than 75°. In the service position of the flap assembly, the engine compartment of the motor vehicle 1 is easily accessible. Service works in the engine compartment of the motor vehicle 1 can be performed comfortably.

In the service position of the flap assembly 2, the adjustment device 6 is in a standard extension arrangement. In the standard extension arrangement, the adjustment device 6 has a maximum standard extension length.

In a mounting position of the flap assembly 2, the flap 3 is pivoted in relation to the car body 4 even more. A second opening angle $a_2$ in the mounting position is greater than the first opening angle $a_1$ in the service position. In the exemplary embodiment shown, the second opening angle $a_2$ is approximately 90°. It is advantageous if the second opening angle $a_2$ is slightly smaller than 90° to avoid an inadvertent excess pivoting movement of the flap 3 about the pivot axis 5, in other words beyond a pivot angle of 90°. Advantageously, the second opening angle $a_2$ is between 80° and 90°. Depending on the actual installation of the flap assembly 2 or the adjustment device 6, the second opening angle $a_2$ may also be selected such as to smaller than 80° or greater than 90°.

In the mounting position of the flap assembly 2, the adjustment device 6 is in a maximum extension arrangement. In the maximum extension arrangement, the adjustment device 6 has a maximum extension length.

The design and function of the adjustment device 6 will be explained in more detail in the following sections, taken in conjunction with FIGS. 3 to 5.

The adjustment device 6 has a housing 10 with a longitudinal axis 11. The housing 10 is also referred to as holding sleeve. The housing 10 is formed in one piece of a plastic material.

In the housing 10, an energy storage unit 12 is arranged for displacement along the longitudinal axis 11. In the exemplary embodiment shown, the energy storage unit 12 is configured as a gas spring with an energy storage unit housing 13 and an energy storage unit piston rod 14. In the housing 10, the energy storage unit 12 is guided for displacement in relation to the longitudinal axis 11. In particular, the outer contour of the energy storage unit housing 13 essentially corresponds to the inner contour of the housing 10. The housing 10 is hollow cylindrical. The energy storage unit housing 13 is cylindrical. The energy storage unit housing 13 is acted upon by a compressed fluid, in particular a compressed gas. When the energy storage unit piston rod 14 is retracted into the energy storage unit housing 13, a counter pressure develops, which acts counter to the retraction movement of the energy storage piston rod 14. The counter pressure assists an extension movement of the energy storage unit piston rod 14 out of the energy storage unit housing 13, for example when opening the flap assembly 2.

The adjustment device 6 has a first mounting spot 15 at its first end 7 near the piston rod and a second mounting spot 16 at the second end 8 near the housing. The mounting spots 15, 16 allow the adjustment device 6 to be hinged to the flap 3 or the car body 4. The mounting spots 15, 16 define the respective extension length of the adjustment device 6.

The adjustment device 6 further has a friction damping unit 17. The friction damping unit 17 is fixed to the housing. The friction damping unit 17 has at least one friction member arranged in a groove-like recess provided for this purpose, said recess being formed circumferentially on the housing 10.

In an axial direction, in other words in a direction parallel to the longitudinal axis, 11, the recess 19 is in each case delimited by an integral annular shoulder 10. The annular shoulders 20 are axial stop surfaces for the friction member 18.

In the exemplary embodiment shown, the friction member 18 is made of a friction material. The friction member 18 is configured as a friction strip with a strip length that essentially corresponds to the circumference around the energy storage unit 12, in particular the energy storage unit housing 13. The strip length may in particular also be selected such as to be shorter than the circumference around the energy storage unit 12. What is important is that the friction member 18 is arranged around the energy storage unit 12 at least partly in the circumferential direction around the longitudinal axis 11. It is in particular conceivable for the energy storage unit 12 to be exposed at least partly in the region of the friction damping unit 17 when seen in the circumferential direction.

The friction member 18 is arranged between the energy storage unit 12 and the housing 10 in the radial direction relative to the longitudinal axis 11. The function of the adjustment device, in particular for use in the flap assembly 2, will be explained in more detail in the following sections.

Figure 3:
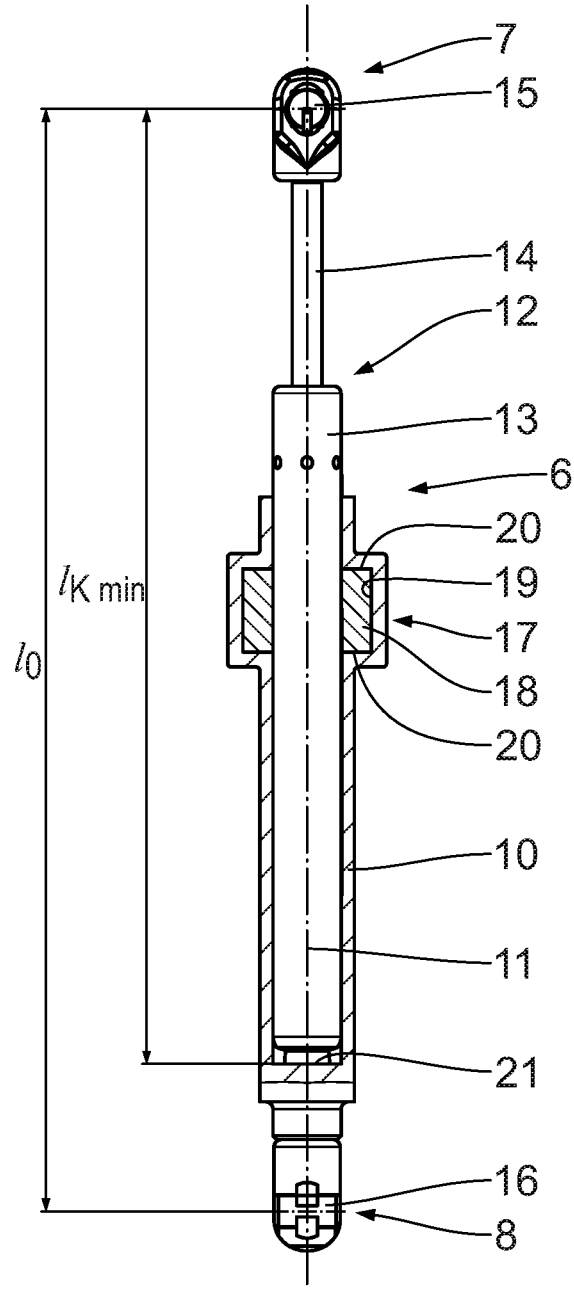
FIG. 3 shows a longitudinal sectional view of the adjustment device according to the invention in an arrangement when the flap assembly is closed.

In the retracted arrangement shown in FIG. 3, the adjustment device has a minimum extension length $l_0$. In the retracted arrangement, the energy storage unit 12 has a minimum energy storage unit length $l_{K\ min}$. The energy storage unit 12 is retracted maximally in the housing 10. The energy storage unit 12 abuts a lower housing bottom 21.

When it is desired to open the flap assembly 2, the flap 3 is unlocked and is then able to be pivoted in relation to the car body 4. Said pivoting movement is assisted by the adjustment device 6, in particular by the energy storage unit 12. The pressure that has developed in the energy storage unit 12 is used to move the energy storage unit 12 to the standard extension arrangement shown in FIG. 4. In the standard extension arrangement, the adjustment device 6 has a maximum standard length 11. In the standard extension arrangement, the energy storage unit 12 is still maximally retracted in the housing 10 and abuts the housing bottom 21.

The energy storage unit 12 is in a maximum extension position with a maximum energy storage unit length $l_{K\ max}$. The difference in length between the minimum extension length $l_0$ and the maximum standard extension length $l_1$ is equal to the travel distance $h_K$ of the energy storage unit 12, with $h_K = l_{K\ max} - l_{K\ min}$. Displacing the adjustment device 6 from the retracted arrangement into the standard extension arrangement may in particular take place automatically as a result of the internal pressure in the gas spring. In order to extend the adjustment device 6 even further, said adjustment device 6 can be moved from the standard extension arrangement in FIG. 4 into the maximum extension position as shown in FIG. 5 by pulling the energy storage unit 12, which is already extended maximally, out of the housing 10. In the maximum extension position, the adjustment device 6 has a maximum extension length $l_2$, wherein in particular $l_2 > 1.05 \cdot l_1$, in particular $l_2 > 1.1 \cdot l_1$, in particular $l_2 > 1.2 \cdot l_1$, and in particular $l_2 > 1.25 \cdot l_1$. The maximum extension length $l_2$ is obtained from the standard extension length $l_1$ and the additional travel distance $h_V$ along which the energy storage unit 12 has been pulled out of the adjustment device 6. The maximum energy storage unit length $l_{K\ max}$ has not changed in the maximum extension arrangement as shown in FIG. 5.

Figure 4:
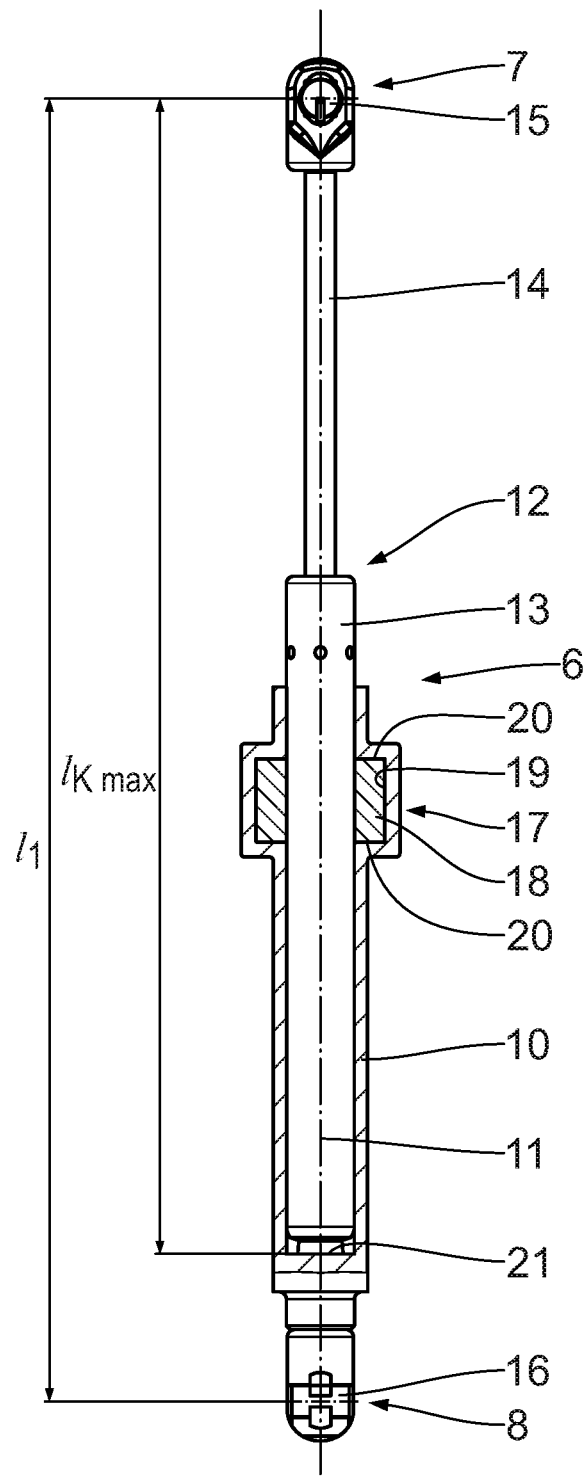
FIG. 4 shows a view, corresponding to FIG. 3, in a standard extension arrangement for a service position of the flap assembly.
Figure 5:
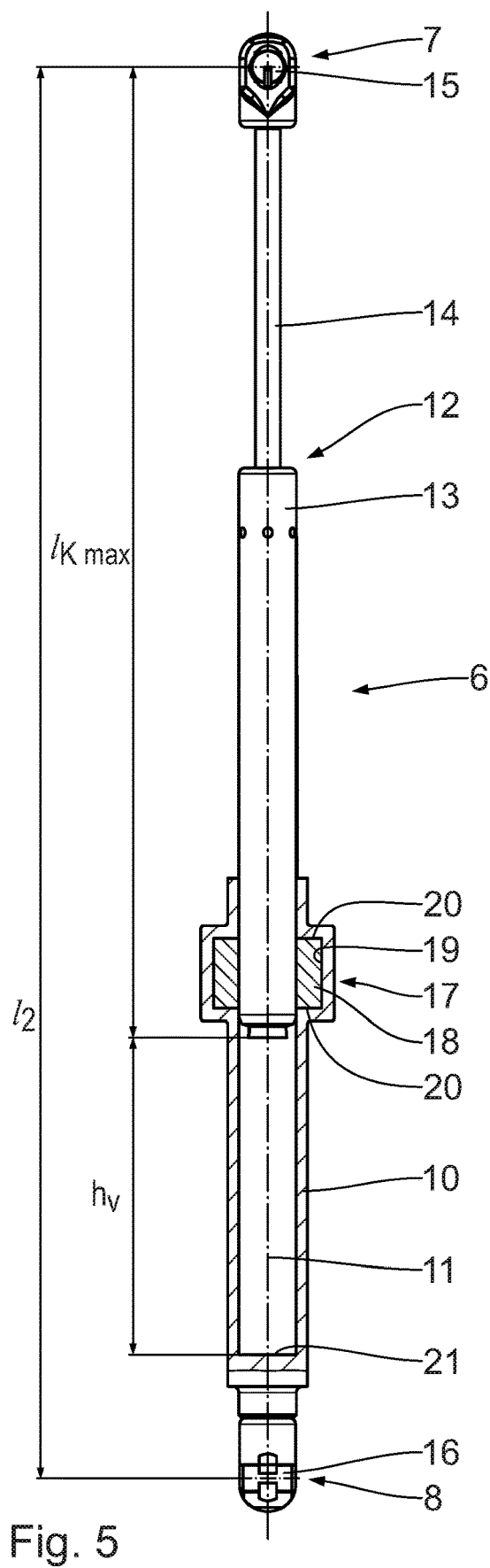
FIG. 5 shows a view, corresponding to FIG. 3, in a maximum extension position of the adjustment device for a mounting position of the flap assembly.

During the displacement of the adjustment device 6 between the standard extension arrangement as shown in FIG. 4 and the maximum extension arrangement as shown in FIG. 5, the relative movement between the energy storage unit 12 and the friction damping unit 17 generates a frictional force, which acts counter to the relative displacement. The frictional force prevents an automatic displacement of the flap counter to the opening movement. The magnitude of the frictional force is in particular such that a stable arrangement of the flap 3 is ensured, irrespective of the opening angle.

What is claimed is:

1. An adjustment device for a flap assembly, the adjustment device comprising:
    a housing having a longitudinal axis;
    two mounting spots spaced from one another along the longitudinal axis;
    an energy storage unit acting along the longitudinal axis, wherein the energy storage unit is configured as a gas spring, the gas spring comprising an energy storage unit housing and an energy storage unit piston rod, wherein the energy storage unit is arranged at least partly in the housing such as to be displaceable along the longitudinal axis;
    a friction damping unit acting serially in relation to the energy storage unit, wherein the energy storage unit is arranged at least partly in the housing such as to be displaceable relatively in relation to the friction damping unit.

2. The adjustment device as claimed in claim 1, wherein the friction damping unit is fixed to the housing.

3. The adjustment device as claimed in claim 1, wherein the friction damping unit comprises a friction member, the friction member being in contact with a portion of the energy storage unit housing.

4. The adjustment device as claimed in claim 3, wherein the friction member is held axially in the housing.

5. The adjustment device as claimed in claim 1, wherein the housing is formed in one piece.

6. The adjustment device as claimed in claim 5, wherein the housing is formed of a plastic material.

7. The adjustment device as claimed in claim 1, wherein the energy storage unit and the friction damping unit are coupled to one another serially and steplessly.

8. A motor vehicle with a flap assembly and with an adjustment device as claimed in claim 1.

9. The adjustment device as claimed in claim 1, wherein the energy storage unit housing is movable along the longitudinal axis relative to the housing.

10. The adjustment device as claimed in claim 1, wherein the friction damping unit is located between the housing and the energy storage unit housing.

11. An adjustment device for a flap assembly, the adjustment device comprising:
    a housing having a longitudinal axis;
    two mounting spots spaced from one another along the longitudinal axis;
    an energy storage unit acting along the longitudinal axis, wherein the energy storage unit is configured as a gas spring, the gas spring comprising an energy storage unit housing and an energy storage unit piston rod;
    a friction damping unit acting serially in relation to the energy storage unit, wherein the friction damping unit has a friction member, wherein the friction member is arranged between the housing and the energy storage unit housing in a radial direction relative to the longitudinal axis to provide a friction damping effect between the housing and the energy storage unit.

12. The adjustment device as claimed in claim 11, wherein the friction member is in contact with a portion of the energy storage unit housing and a portion of the housing.

13. The adjustment device as claimed in claim 11, wherein the energy storage unit housing is movable along the longitudinal axis relative to the housing.

14. An adjustment device for a flap assembly, the adjustment device comprising:
    a housing having a longitudinal axis, wherein the housing comprises a lower housing bottom and an opposing opening;
    two mounting spots spaced from one another along the longitudinal axis;
    an energy storage unit acting along the longitudinal axis, wherein the energy storage unit is configured as a gas spring, the gas spring comprising an energy storage unit housing and an energy storage unit piston rod, wherein the energy storage unit is guided through the opening of the housing;
    a friction damping unit acting serially in relation to the energy storage unit, wherein the friction damping unit is arranged at the opening of the housing.

15. The adjustment device as claimed in claim 14, wherein the friction damping unit comprises a friction member, the friction member being in contact with a portion of the energy storage unit housing.

16. The adjustment device as claimed in claim 14, wherein the energy storage unit housing is movable along the longitudinal axis relative to the housing.

17. The adjustment device as claimed in claim 14, wherein the friction damping unit is located between the housing and the energy storage unit housing.

18. The adjustment device as claimed in claim 14, wherein the friction damping unit comprises a friction member, the friction member being located between the housing and the energy storage unit housing.

19. The adjustment device as claimed in claim 18, wherein the friction member is in contact with the energy storage unit housing and the housing.

20. The adjustment device as claimed in claim 19, wherein a recess is defined by the housing, at least a portion of the friction member being arranged in the recess.

* * * * *